(12) United States Patent
Hino et al.

(10) Patent No.: US 6,469,074 B1
(45) Date of Patent: Oct. 22, 2002

(54) COMPOSITION OF CYANATE ESTER, EPOXY RESIN AND ACID ANHYDRIDE

(75) Inventors: Hirohisa Hino, Osaka (JP); Taro Fukui, Osaka (JP); Kenji Kitamura, Osaka (JP); Shinji Hashimoto, Osaka (JP); Naoki Kanagawa, Osaka (JP)

(73) Assignee: Matsushita Electric Works, Ltd., Kadoma (JP)

( * ) Notice: Subject to any disclaimer, the term of this patent is extended or adjusted under 35 U.S.C. 154(b) by 0 days.

(21) Appl. No.: 09/577,612

(22) Filed: May 25, 2000

(30) Foreign Application Priority Data

May 26, 1999 (JP) ............................. 11-146778
May 26, 1999 (JP) ............................. 11-146779

(51) Int. Cl.[7] .......................... C08K 3/36; C08L 63/02; C08L 63/04; H01L 23/29
(52) U.S. Cl. ..................... 523/466; 257/789; 257/793; 428/413; 523/427; 523/457; 523/459; 525/488; 525/524; 525/533
(58) Field of Search ................ 523/466, 427, 523/457, 459; 525/533, 488, 524; 428/413; 257/789, 793

(56) References Cited

U.S. PATENT DOCUMENTS

| 4,142,034 A | | 2/1979 | Schroll ........................ 528/120 |
| 5,656,862 A | * | 8/1997 | Papathomas et al. ....... 257/778 |
| 5,855,821 A | * | 1/1999 | Chau et al. ................. 252/514 |

FOREIGN PATENT DOCUMENTS

| JP | 10-2878909 A | * | 10/1998 |

* cited by examiner

Primary Examiner—Robert E. L. Sellers
(74) Attorney, Agent, or Firm—Oblon, Spivak, McClelland, Maier & Neustadt, P.C.

(57) ABSTRACT

Disclosed is a liquid epoxy resin composition for sealing a semiconductor device which comprises (A) a cyanic acid ester, (B) an epoxy resin, (C) an inorganic filler, (D) a metal chelate and/or a metal salt, and at least one of (E1) an acid anhydride, (E2) a dihydrazide compound and (F) a silicone resin gel, wherein at least one of components A and B is liquid at room temperature, component E1 is liquid at room temperature, and the weight ratio of component C to the total weight of the composition, the weight ratio of component A to component B, and the weight ratio of component E1, E2 or F to the total weight of the composition except component C each ranges a specific ratio.

16 Claims, No Drawings

COMPOSITION OF CYANATE ESTER, EPOXY RESIN AND ACID ANHYDRIDE

FIELD OF THE INVENTION

This invention relates to a liquid epoxy resin composition used to seal a semiconductor device, etc., a semiconductor device sealed with the resin composition, and a process for producing the sealed semiconductor device.

BACKGROUND OF THE INVENTION

Epoxy resin compositions have excellent electrical characteristics and adhesive strength and are widely used in a variety of electric and electronic fields. In particular, they are used for sealing semiconductor devices to secure high sealing reliability. Methods of sealing semiconductor devices with an epoxy resin composition which are widely carried out include transfer molding using a powdered composition or potting using a liquid composition and a dispenser.

With the recent tendency of electronic equipment getting more and more mobile and functional, the demands for semiconductor packages of higher integrity, higher density, smaller thickness, and smaller weight have been increasing. To address these demands new types of semiconductor packages have emerged, such as exemplified by a ball grid array (BGA) (with which a high density is achieved by area array connections), chip scale packages (CSP), and multi-chip modules (MCM).

Where these new types of semiconductor packages are sealed by conventional sealing techniques using a molding die and a powdered sealing material, the achievable thickness reduction is limited, and wires tend to be deformed (wire sweep). Therefore, liquid sealing materials have now come to be used. Use of a liquid sealing compound is advantageous over the transfer molding method which includes two steps; the step of previously compacting a powdered sealing compound into a tablet and the step of plasticizing the tablet in a pot. However, the problem of the liquid sealing compound resides in that it is inferior to the powdered sealing compound in sealing workability and reliability. The superiority of the powdered sealing compound over the liquid one is attributed to invulnerability to hydrolysis in a moisture resistance reliability test because of a phenolic curing agent contained therein and its high adhesive strength to a chip. In addition, the sealing compound used in the transfer molding is solid (powder) in ambient temperature, allowing a filler to be incorporated in an increased amount and the resin to have an increased glass transition temperature (Tg), thereby to exhibit excellent solder resistance and heat shock resistance.

On the other hand, the choice of curing agents and cure accelerators that can be employed in liquid sealing compounds is limited because of restrictions that the resulting compound should be liquid at ambient temperature, be of one-pack type and of long pot life. Amine compounds and acid anhydrides are generally used as curing agents or cure accelerators but have the following disadvantages. Of the amine compounds, liquid aromatic ones are so reactive with an epoxy group only to give a short pot life. Although solid amines typically exemplified by dicyandiamide secure a long pot life, they require too high a reaction initiation temperature, and the resulting compound is hygroscopic and inferior in electrical characteristics. A cured epoxy resin, cured by the acid anhydride curing agent, tends to be inferior not only in moisture resistance reliability because the ester linkage in the crosslinked structure is susceptible to hydrolysis but also in heat resistance reliability due to insufficient chemical adhesion. The phenolic curing agents, which are used in powdered sealing compounds to be molded in a molding die, are solid at ambient temperature so that they are hardly applicable to liquid sealing compounds loaded with fillers. If used, they would greatly increase the viscosity of a liquid epoxy resin. Addition of a solvent could decrease the viscosity, but the solvent will cause voids in the cured product, which ruin the appearance and deteriorate reliability, hardly equaling to the powdered sealing compounds molded in a molding die in sealing performance. Moreover any of these known curing systems fails to satisfy both the requirements of a long pot life at room temperature and of quick curability at high temperature and therefore unsuited to such large-scale sealing as can be carried out by transfer molding.

Under these circumstances, it has been keenly demanded to develop a liquid sealing compound which has satisfactory workability and is not inferior in sealing reliability and curability to a powdered sealing compound to be molded in a molding die.

In carrying out sealing of semiconductor chips such as BGA or CSP, the chips are mounted on a printed wiring board and then sealed by overcoating. If the sealing resin has a high elastic modulus, the printed wiring board would be warped appreciably and becomes practically useless. Therefore, sealing compounds usually contain an agent for reducing the elastic modulus (hereinafter referred to as a low-elasticity component).

Low-elasticity components generally known in the art include polybutadiene rubber, silicone powder, and silicone oil. However, they have the following disadvantages. The polybutadiene rubber has low long-term heat resistance on account of the thermal deterioration (oxidation) of the double bonds. Although silicone resins are thermally stable, powder type ones tend to agglomerate and separate, migrating upward in liquid, and increase the viscosity of the liquid, failing to be dispersed uniformly, only to produce small effects in reducing elasticity. The silicone oil is liable to form an upper separate phase in a liquid epoxy resin sealing compound because of poor compatibility with the epoxy resin and its small specific gravity. Further, the silicone oil is apt to bleed out in the interface between the sealant and the package substrate and act like a parting agent to reduce the adhesion, which may lead to interfacial separation. Thus, an improvement on a low-elasticity component for a sealing compound is also demanded.

SUMMARY OF THE INVENTION

It is an object of the present invention to provide a liquid epoxy resin composition for sealing a semiconductor device, which cures quickly to provide a cured resin securing moisture resistant and heat resistant reliability for semiconductor devices while retaining the merits of conventional liquid sealing compounds, i.e., being liquid at ambient temperature and having a low viscosity easy in handling and a long pot life.

It is another object of the invention to provide a liquid epoxy resin composition for sealing a semiconductor device, which possesses the above-described characteristics and, in addition, provides a cured product with low elasticity without involving such problems as agglomeration, upward migration or phase separation in liquid.

It is still another object of the invention to provide a semiconductor device which is sealed by using the liquid epoxy resin composition.

It is yet another object of invention to provide a process for producing the semiconductor device.

The present invention provides a liquid epoxy resin composition for sealing a semiconductor device which comprises (A) a cyanic acid ester, (B) an epoxy resin, (C) an inorganic filler, (D) a metal chelate and/or a metal salt, and (E1) an acid anhydride, wherein at least one of components (A) and (B) is liquid at room temperature, component E1 is liquid at room temperature, the weight ratio of component C to the total weight of the composition is 0.60:1 to 0.95:1, the weight ratio of component A to component B is 0.76:1 to 1.43:1, and the weight ratio of component E1 to the total weight of the composition except component C is 0.01:1 to 0.3:1.

The present invention also provides a liquid epoxy resin composition for sealing a semiconductor device which comprises (A) a cyanic acid ester, (B) an epoxy resin, (C) an inorganic filler, (D) a metal chelate and/or a metal salt, and (E2) a dihydrazide compound, wherein at least one of components A and B is liquid at room temperature, the weight ratio of component C to the total weight of the composition is 0.60:1 to 0.95:1, the weight ratio of component A to component B is 0.50:1 to 1.82:1, and the weight ratio of component E2 to the total weight of the composition except component C is 0.0 1:1 to 0.15:1.

The present invention also provides a liquid epoxy resin composition for sealing a semiconductor device which comprises a liquid epoxy resin composition for sealing a semiconductor device which comprises (A) a cyanic acid ester, (B) an epoxy resin, (C) an inorganic filler, (D) a metal chelate and/or a metal salt, and (F) a silicone resin gel, wherein at least one of components A and B is liquid at room temperature, the weight ratio of component A to component B is 0.76:1 to 1.43:1, the weight ratio of component C to the total weight of the composition is 0.60:1 to 0.95:1, and the weight ratio of component F to the total weight of the composition except component C is more than 0.0 1:1 and less than 0.3:1.

The present invention further provides a semiconductor device sealed with each of the above-described liquid epoxy resin compositions.

The present invention furthermore provides a process for sealing a semiconductor device which comprises injection molding each of the above-described liquid epoxy resin compositions by use of a molding die.

DETAILED DESCRIPTION OF THE INVENTION

In order for the epoxy resin composition of the invention to be liquid, it is necessary that the mixture of components A and B be liquid at room temperature. In order for the mixture of components A and B to be liquid at room temperature, it is necessary that at least one of them be liquid at room temperature.

The cyanic acid ester as component A is a compound having a cyanate group (—OCN), including 4,4'-ethylidenebisphenylene cyanate (hereinafter referred to as compound A1), 2,2-bis(4-cyanatophenyl)propane, bis(4-cyanato-3,5-dimethylphenyl)methane, and bis(4-cyanatophenyl)thioether. Compound A1 is liquid at room temperature, and the latter three are crystalline and solid at room temperature. Prepolymers of these cyanic acid ester compounds are also useful as component A. Component A to be used is selected from among these compounds so as to give a mixture liquid at room temperature when mixed with an epoxy resin as component B.

It is preferred that component A comprises 4,4'ethylidenebisphenylene cyanate (A1). Compound A1 has a cyanate group at both ends of a bisphenol E skeleton, being represented by formula:

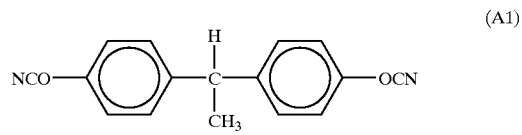

(A1)

and is liquid having a viscosity of about 100 cP at room temperature. The other cyanic acid esters, such as the above-mentioned 2,2-bis(4-cyanatophenyl)propane having a bisphenol A skeleton and bis(4-cyanato-3,5-dimethylphenyl)methane having a dimethylphenyl skeleton, are highly crystalline and are solid at room temperature. Even if these crystalline cyanic acid esters may be liquefied by dissolving in a liquid epoxy resin while hot, they tend to crystallize to solidify on cooling. The inventors have found that such crystalline cyanic acid esters are prevented from solidifying when used in combination with compound A1 having a bisphenol E skeleton.

It is preferable that the content of ionic impurities (e.g., ammonium ion, bromide ion, chloride ion, sulfate ion and nitrate ion) in the cyanic acid ester as component A be as small as possible, since the ionic impurities give cause for deterioration of electrical characteristics of the semiconductor seal. A preferred weight ratio of compound A1 to the whole component A, compound A1/A, is 0.1:1 to 1:1, particularly 0.5:1 to 1:1, especially 0.7:1 to 1:1. If the weight ratio of compound A1 is less than 0.1:1, it is difficult to prevent the crystalline cyanic acid ester from solidifying.

The epoxy resin as component B is a compound having two or more glycidyl groups per molecule. It is preferred for the epoxy resin be liquid at room temperature. Component B includes a single liquid epoxy resin, a mixture of liquid epoxy resins, and a mixture of a liquid epoxy resin and a solid epoxy resin. Useful epoxy resins include, but are not limited to, bisphenol A epoxy resins, bisphenol F epoxy resins, novolak epoxy resins, halogenated epoxy resins, glycidyl ester epoxy resins, alicyclic epoxy resins, biphenyl epoxy resins, naphthalene epoxy resins, and heterocyclic epoxy resins. Of these epoxy resins particularly preferred are bisphenol A or bisphenol F epoxy resins represented by formula shown below wherein n is 0 or 1 which are obtained by molecular distillation. They are preferred for their low viscosity and very small content of ionic impurities.

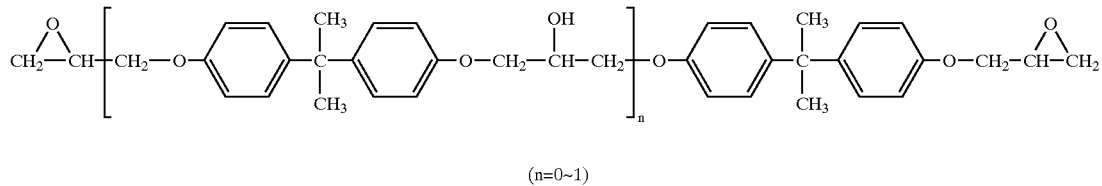

(n=0~1)

To secure the physical properties of a cured resin and seal reliability, the components A to B weight ratio should be 0.50:1 to 1.82:1, preferably 0.76:1 to 1.43:1, still preferably 0.91:1 to 1.43:1, particularly preferably 0.91:1 to 1.25:1. The limitation of the components A/B ratio is based on the following reasons. It is known that a cyanic acid ester alone trimerizes in the presence of a metal catalyst to form a triazine ring. This reaction primarily takes place in high temperature at about 180° C. or higher. A composite resin system comprising a cyanic acid ester and an epoxy resin also involves a reaction between the cyanate group and the epoxy group, so that the system seems to entail a plurality of competitive reactions. If the A/B ratio is greater than 1.82:1, the reaction system is short of the epoxy resin to leave the cyanate group unreacted in curing at 160° C. or lower. The unreacted cyanate group will be hydrolyzed into a carbamate group in moisture resistance reliability tests such as a pressure cooker test (PCT), which will further undergo decarboxylation to cause a failure in moisture resistance reliability. If, on the other hand, the A/B ratio is smaller than 0.50:1, an excess of the epoxy resin remains unreacted and causes a reduction of crosslinking density of the cured resin, which will lead to a reduction in glass transition temperature or an increase in moisture absorption. As a result, the cured resin has an increased coefficient of thermal expansion and may have deteriorated heat cycle and reflow reliability.

The inorganic filler which can be used as component C includes crystalline silica, fused silica, alumina, calcium carbonate, and zinc oxide. While not limiting, it is preferred for the fused silica to be spherical or not to be angular and to have a maximum particle size of 100 μm or less so as not to scratch the passivation film of semiconductor chips.

The weight ratio of component C to the total weight of the composition is 0.60:1 to 0.95:1, preferably 0.70:1 to 0.90:1, still preferably 0.75:1 to 0.85:1. If the ratio of component C is smaller than 0.60:1, the resin composition the resin content of which is larger undergoes increased shrinkage on sealing. Further, the cured resin has an increased thermal expansion coefficient, tending to cause an increased warp of the wiring substrate or defects such as cracks of chips on thermal stress application. Furthermore, the cured resin has an increased moisture absorption, which may cause cracks on reflow. If the ratio of component C is larger 0.95:1, the composition becomes too viscous due to shortage of liquid components, being difficult to handle as a liquid and incapable of sealing.

The metal chelate and/or metal salt as component D works as a curing catalyst for the cyanic acid ester as component A. The metal chelate includes nonionic or ionic metal chelates having 1 to 6 or even more chelate rings. Metals of the metal chelates include iron, cobalt, zinc, tin, aluminum, and manganese. Ligands of the metal chelates include acetylacetonato, salicylaldehyde, and benzoylacetone. The metal salt includes naphthenates and octenates.

In a highly preferred embodiment of the present invention, an iron (III) chelate (hereinafter referred to as compound D1) or a cobalt (III) chelate (hereinafter referred to as compound D2) is used as component D to produce the following effects. It is known that a cyanic acid ester trimerizes at about 180° C. or higher using a metal chelate as a nucleus to form a triazine skeleton. In other words, various metal chelates are known to be capable of catalyzing curing of a cyanic acid ester alone. Since the attractivity of the metal chelate curing catalysts for a cyanate group varies depending on the metal, the rate of the trimerization reaction varies according to the metal chelate used. In general, chelates of zinc, tin, copper, manganese, titanium and aluminum are known. However, where the reaction system contains an epoxy resin, etc. as a resinous component in addition to the cyanic acid ester as in the case of the invention, the reaction mechanism becomes very complicated, involving not only the trimerization reaction of the cyanate group but the reaction between the cyanate group and the epoxy group to form an oxazoline skeleton.

In the embodiment hereinafter described, wherein the epoxy resin composition contains a silicon resin gel as a low-elasticity component, the resin system tends to show thixotropy. A thixotropic liquid has a great surface tension and is liable to form a convex surface, which is disadvantageous in applications where the seal face must be flat such as with BGA packages having cavity down configuration. In such cases, compound D1 added as component D considerably reduces the thixotropy, and the resin composition shows high flowability. The ligand of compound D1 is not particularly limited and includes, for example, acetylacetonato, salicylaldehyde, and benzoylacetone. The amount of the curing catalyst D1 to be used is dependent on the amount of the cyanic acid ester as component is dependent on the amount of the cyanic acid ester as component A. A preferred D1/A weight ratio ranges from 0.0001:1 to 0.01:1, particularly from 0.0005:1 to 0.005:1, especially from 0.001:1 to 0.003:1. The curing catalyst D1, being used in the preferred amount, secures satisfactory curing characteristics and a long pot life.

To the contrary, where there is no dams around a chip like a chip-on-board (COB) package, it is required for the sealing resin to have high thixotropy, hardly flowing, in order to seal a small area efficiently. Should the resin flow, the chip or wires are exposed to cause defects. In this case, high thixotropy can be realized by the use of compound D2, a cobalt (III) chelate, as component D. The ligand of the cobalt (III) chelate is not particularly limited and includes acetylacetonato, salicylaldehyde, and benzoylacetone. The amount of the curing catalyst D2 is dependent on the amount of the cyanic acid ester as component A. A preferred D2/A weight ratio ranges from 0.0001:1 to 0.01:1, particularly from 0.0005:1 to 0.005:1, especially from 0.001:1 to 0.003:1. The curing catalyst D2, being used in the preferred amount, secures satisfactory curing characteristics and a long pot life.

The resin composition of the invention can contain (E) a cure accelerator selected from (E1) an acid anhydride and (E2) a dihydrazide compound.

The acid anhydride E1 is a cure accelerator for the reaction between the cyanic acid ester (component A) and the epoxy resin (component B). Component E1 reduces the thixotropy of the epoxy resin composition, bringing about great effects on improving flowability of the sealing compound. Since the epoxy resin composition of the invention is liquid at room temperature, component E1 should also be liquid at room temperature.

The weight ratio of component E1 to the total weight of the composition except component C is 0.01:1 to 0.3:1, preferably 0.05:1 to 0.2:1, still preferably 0.10:1 to 0.15:1. If the weight ratio is less than 0.01:1, the above-described effects are hardly obtainable. If it exceeds 0.3:1, the reactivity of the system decreases, and the resulting cured resin has reduced moisture resistance reliability. Although a curing reaction scarcely takes place in a system consisting solely of components E1 and B, the inventors have found that the system additionally comprising components A and D exhibits satisfactory reactivity through unknown mechanism. It is assumed that the hydroxyl group and active hydrogen generated in the reaction between the cyanic acid ester and the epoxy resin to form an oxazoline skeleton accelerates the reaction with the acid anhydride.

The dihydrazide compound E2 is a compound having two hydrazide groups ($-NHNH_2$) per molecule, of which the active hydrogen of the terminal $NH_2$ group is reactive with an epoxy group, a cyanate group, etc. Examples of the dihydrazide compound E2 include, but are not limited to, adipic dihydrazide, succinic dihydrazide, valine dihydrazide, and 2,4-dihydrazino-6-methylamino-sym-triazine.

The weight ratio of component E2 to the total weight of the composition except component C is 0.01:1 to 0.15:1, preferably 0.02:1 to 0.1:1, still preferably 0.02:1 to 0.07:1. If the weight ratio of component E2 is less than 0.0:1, the above-described effects are hardly obtainable. If the weight ratio exceeds 0.15:1, the reactivity is so high that the pot life is short.

Although component E2 is solid at room temperature and therefore has low reactivity with an epoxy group at room temperature, it is a latent curing agent that exhibits high reactivity with an epoxy resin at 150° C. or higher. Further, the active hydrogen of the dihydrazide compound is also highly reactive with the cyanate group (—OCN) of the cyanic acid ester at about 140° C. or higher. That is, the resin composition presenting the reaction systems of components A-B, components B-E2 and components A-E2 exhibits latent curing properties (i.e., a long pot life) and is expected to have high adhesion.

2,4-Dihydrazine-6-methylamino-sym-triazine (hereinafter referred to as 2.4HT), one of the dihydrazide compounds E2, has a heat-resistant triazine nucleus having hydrazide groups attached thereto. JP-B-63-19526 teaches that 2.4HT exhibits excellent latent curing properties and heat resistance in the reaction with an epoxy resin. When a resin composition consisting of component A, component B, 2.4HT as component E2, and component D is cured by heating, the thermal analysis revealed exothermic peaks around 120° C. and around 150° C. While the accurate reaction mechanism is not clear, it is assumed that the temperature elevation first causes the reaction between the cyanic acid ester (component A) and 2.4HT (component E2), which acts as a trigger for the reaction between the reaction product of components A and E2 and component B, the reaction between the unreacted component A and component B, and the reaction between component E2 and component B in competition with each other. In other words, it is considered that the reaction between components A and B, which is to take place at around 150° C. in the presence of component D alone, initiates at a lower temperature, around 120° C., in the co-presence of 2.4HT. In the composition discloses in JP-B-63-19526 supra, 2.4HT is used in a large amount of 10 to 30 PHR because it is expected to serve as a primary curing agent for an epoxy resin. In the present invention, however, component E2 acts as a reaction accelerator for the reaction between components A and B as can be verified from the fact that the curing reaction of components A and B is induced at a reduced temperature of about 120° C. when component E2 is added in such a trace amount as has a weight ratio of 0.01:1 to 0.15:1 to the total amount of the composition except component C. The fact that addition of component E2 triggers off the reaction of the three components A, B, and E2 at a low temperature of about 120° C. indicates that the above-specified formulation holds a very effective balance.

The above-described effect is of great significance seeing that curing of a liquid sealing compound is generally effected at or below 150° C. with considerations given to the heat resistance of the package substrate.

The gel time at 150° C. of the three component system of components A, B, and D is about 10 minutes, whereas addition of 24HT as component E2 shortens the gel time to 2 to 3 minutes.

Since component E2 is low-reactive solid (particles) at room temperature, it exists in the composition in a dispersed state, not dissolving, and scarcely induces reaction. Therefore, the change in viscosity of the composition at room temperature is suppressed to secure a long pot life. It is important for the particulate component E2 to be finely ground beforehand so that it may manifest the optimum reactivity at high temperature. In order to improve the reactivity with other components, particles having a large specific surface area are preferred. For solid component E2 to be fine particles is also desirable for making a uniform cured resin in sealing semiconductor devices on a fine circuit to obtain satisfactory moisture resistance and electrical characteristics. Further, fine particles of component E2 are prevented from sedimentation in the liquid composition, which is also effective in prolonging the pot life of the sealing compound. From all these considerations, it is preferred for component E2 to have an average particle size of not greater than 100 $\mu$m. In order to obtain a uniform cured resin for sealing semiconductor devices on a fine circuit, it is still preferred for component E2 to have an average particle size of 30 $\mu$m or smaller, particularly 5 $\mu$m or smaller.

Containing a nitrogen atom which forms a firm crosslinked structure with the epoxy rein, component E2 exhibits stronger adhesion than other curing accelerators such as acid anhydrides thereby enhancing the moisture-resistant and heat-resistant reliability of the cured resin.

The silicone resin gel which can be used as component F is a low-elasticity component that reduces the elastic modulus of the sealing resin thereby to suppress warpage of the wiring substrate.

The silicone resin gel is a substance midway between powder and oil. A mixture of a silicone oil, which is a main ingredient of a silicone resin gel, and a silicone oil as hardener is added to a heated epoxy resin and stirred in strong shear in a mixer, etc. to finely disperse a gel component to form a sea-island structure. The thus obtained finely dispersed state manifests low-elasticity effects without involving such problems as agglomeration, upward migration or phase separation of particles in liquid. The islands in the sea-island structure are desirably 10 μm or smaller. To make the islands of this size, the weight ratio of component F to the total weight of the composition except component C is more than 0.01:1 and less than 0.3:1, preferably more than 0.01:1 and less than 0.2:1. Addition of component F in a weight ratio of 0.3:1 or greater increases the viscosity and reduces the workability of the epoxy resin composition. Addition of component F in a weight ratio of not more than 0.01:1 is ineffective on reduction of elastic modulus.

The silicone resin gel as component F preferably comprises a silicone polymer represented by the following formula and a self-curing silicone rubber or gel.

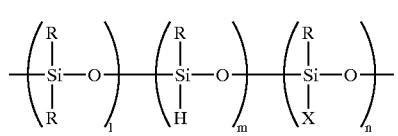

wherein R represents an alkyl group (e.g., methyl or ethyl) or a phenyl group; X represents a polyoxyalkylene-containing group (e.g., polyoxyethylene, polyoxypropylene or poly (oxyethylene/oxypropylene); and l, m, and n each represent an integer of 1 or greater.

In the above formula, $l/(l+m+n)$ is preferably 0.05 to 0.99; $m/(l+m+n)$ is preferably 0.001 to 0.5; and $n/(l+m+n)$ is preferably 0.001 to 0.8. The silicone polymer may be either a block copolymer or a random copolymer.

The self-curing silicone rubber or gel is not particularly restricted as long as it has a vinyl group, etc. to which an SiH group can be added. Those of addition reaction type are preferred. They may be used either individually or as a mixture thereof. The silicone polymer helps the self-curing silicone rubber or gel be dispersed to form a fine sea-island structure. Part of the silicone polymer is expected to react with the self-curing silicone rubber or gel.

The epoxy resin composition can further contain (G) a coupling agent selected from (G1) a titanate coupling agent and (G2) an epoxysilane coupling agent. While it is generally known to use a silane coupling agent containing silicon as a metal nucleus (e.g., epoxysilanes and aminosilanes) in epoxy resin sealing compounds, the inventors have found that a titanate coupling agent G1 containing titanium as a metal nucleus brings about improved flow and low-temperature quick curability in the curing system comprising the cyanic acid ester and the epoxy resin. Coupling agents generally used in epoxy resin sealing compounds have a hydrolyzable group (e.g., methoxy) reactive with the inorganic component (e.g., silica) and a functional group (e.g., epoxy or vinyl) reactive with the organic component. The inventors have ascertained that addition of the epoxysilane coupling agent G2 to the system comprising the cyanic acid ester brings about markedly powerful adhesive strength, which seems attributable to the high reactivity between the cyanate group of the cyanic acid ester and the epoxy group of the epoxysilane coupling agent G2.

Component G is preferably added in a weight ratio of 0.001:1 to 0.1:1, particularly 0.005:1 to 0.05:1, especially 0.01:1 to 0.03:1, to the total weight of the composition except component C. In a weight ratio less than 0.001:1, the expected effect of component G is hardly produced. If component G is added in a weight ratio greater than 0.1:1, reductions of crosslinking density, seal reliability, and pot life can result.

The epoxy resin composition can furthermore contain an amine compound as component H. The amine compound can serve as a cure accelerator for the reaction of components A, B, and D. Where a metal chelate and/or a metal salt is used as a curing catalyst for the reaction system comprising a cyanic acid ester and an epoxy resin, a high temperature is required and yet the curing reactivity is low. This is because the metal chelate and/or the metal salt scarcely participates in the reaction of the epoxy resin. Component H can therefore be used to accelerate the reaction of the epoxy resin and to enhance the curing reactivity.

The amine compound as component H is not particularly limited and includes, for example, imidazole, dicyanamide, and hydrazine compounds. Those having active hydrogen are preferred to accelerate opening of the epoxy ring thereby to enhance the reactivity. It is recommended to avoid a combined use of the amine compound and the acid anhydride as curing accelerators, since it causes foaming ascribed to the acid anhydride and its decomposition products, resulting in poor appearance of the cured resin. That is, component H is effective in the system containing no acid anhydride as a cure accelerator.

Component H is preferably added in a weight ratio of 0.001:1 to 0.2:1, particularly 0.005:1 to 0.1:1, especially 0.01:1 to 0.05:1, based on component B. Being used within this preferred range, component H exhibits satisfactory curing properties and a long pot life.

In addition to the aforementioned components, the epoxy resin composition of the invention can contain various necessary additives, such as flame retardants, pigments, dyes, release agents, defoaming agents, surface active agents, ion trapping agents, diluents, other silicon-based coupling agents, and the like.

The epoxy resin composition of the invention is prepared by uniformly mixing the above-described components in a mixer, a blender, etc., kneading the mixture in a roll, a kneader, etc., and finally defoamed in vacuo. The order of compounding the components is not particularly restricted.

The resulting liquid epoxy resin composition is used to seal semiconductor devices by means of a dispenser, a printing apparatus, etc. to provide the semiconductor devices according to the invention.

Sealing with a liquid epoxy resin composition is commonly carried out under atmospheric pressure by the use of a dispenser, a printing apparatus, etc. For mass production of semiconductor devices with a precise sealing profile, sealing using a molding die is generally followed. As previously stated, sealing in a mold is usually carried out by transfer molding using a tablet (solid sealing compound), which is liquefied by melting in a transfer pot. If a liquid sealing compound could be molded in a die, this would simplify the process and reduce the cost. In order to realize this in large-scale production, the liquid sealing compound must solidify within several minutes at the molding temperature to acquire sufficient strength to be removed from the die. From this point of view, the liquid composition of the invention solidifies in several minutes at 150° C. and gains sufficient strength in 15 minutes and is therefore applicable to sealing in a molding die. Because the epoxy resin composition of the invention has high adhesion to a die, it is recommended to apply a fluorine type or silicone type parting agent to the mold cavity.

Sealing with the epoxy resin composition in a molding die can be carried out, for example, as follows. A semiconductor chip is set in a mold, and the mold is closed tight. The liquid epoxy resin composition is injected into the cavity through the runner and kept at 150° C. for 15 minutes. The sealed semiconductor chip is removed from the mold and post-cured at 150° C. for 3 hours to obtain resin-sealed semiconductor device. In this manner, semiconductor devices can easily be produced by injection molding.

The present invention will now be illustrated in greater detail with reference to Examples, but it should be understood that the invention is not construed as being limited thereto. Compounds used in Examples are as follows.

Component A (Cyanic Acid Ester)

L10: AroCy L-10 available from Asahi Chiba K.K. (4,4'-ethylidenebisphenylene cyanate, a compound having a bisphenol E skeleton, liquid at room temperature)

B10: AroCy B-10 available from Asahi Chiba K.K. (2,2-bis(4-cyanatophenyl)propane, a compound having a bisphenol A skeleton, solid at room temperature)

M30: AroCy M-30 available from Asahi Chiba K.K. (a compound having a bisphenol F skeleton, solid at room temperature)

Component B (Epoxy Resin)

YD8125: available from Toto Kasei K.K. (bisphenol A type epoxy resin prepared by molecular distillation; epoxy equivalent weight: 175; viscosity: 40 P at 25° C.)

Epikote 828: available from Yuka Shell K.K. (bisphenol A type epoxy resin)

Component C (Inorganic Filler)

Commercially available spherical fused silica. Component D (metal chelate or metal salt):

Trisacetylacetonatoiron (III) [$(CH_3COCHCOCH_3)_3Fe$] (referred to as Fe(III) $(acac)_3$)

Trisacetylacetonatocobalt (III) [$(CH_3COCHCOCH_3)_3Co$] (referred to as Co(III) $(acac)_3$)

Manganese naphthenate

Component E1 (Acid Anhydride)

B650: Epichlon B650 available from Dainippon Ink and Chemicals, Inc. (methylhexahydrophthalic anhydride; molecular weight: 168)

B570: Epichlon B570 available from Dainippon Ink and Chemicals, Inc. (methyltetrahydrophthalic anhydride)

Component E2 (Dihydrazide Compound)

2.4HT: 2,4-Dihydrazino-6-methylamino-sym-triazine (average particle size: see footnote of Tables 3 and 4)

ADH: Adipic dihydrazide (average particle size: 15 μm)

SDH: Succinic dihydrazide (average particle size: 15 μm)

VDH: Valine dihydrazide (average particle size: 15 μm)

Component F (Silicone Resin Gel)

Prepared by dispersing a prescribed amount of an RTV silicone resin (XE5818 available from Toshiba Silicone Co., Ltd.) in the epoxy resin (YD8125 or Epikote 828) in a disper at 80° C. for 3 hours.

Component G (Coupling Agent)

KR-TTS: PlenAct KR-TTS available from Ajinomoto Fine Techno K.K. (titanate coupling agent represented by formula:

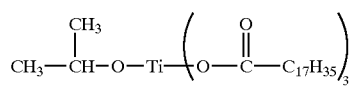

specific gravity: 0.95; a reddish brown liquid)

A187: available from Nippon Unicar Co., Ltd. (epoxysilane coupling agent represented by formula:

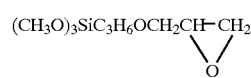

Component H (Amine Compound)

2MA-OK: Cure Sol 2MA-OK, available from Shikoku Chemicals Corp. (2,4-diamino-6-[2'-methylimidazolyl-(1')]-ethyl-s-triazine isocyanuric acid adduct)

PN-23: available from Ajinomoto Co., Ltd.

EXAMPLES 1-1 TO 1-23
AND

Comparative Examples 1-1 to 1-6

The components shown in Tables 1 and 2 below were uniformly mixed in a mixer and defoamed in vacuo to prepare a liquid epoxy resin composition.

The physical properties and curing characteristics of the resulting liquid epoxy resin compositions were measured as follows. Further, silicon chips mounted and wire-bonded on a printed wiring board were sealed with each of the resin compositions, and the resin composition was cured by heating at 120° C. for 1 hour and then at 150° C. for 3 hours. The thus sealed silicon chips were subjected to the following reliability tests. The results obtained are shown in Tables 1 and 2.

Methods of Measurement and Tests

1) Viscosity

The viscosity of the liquid epoxy resin composition at 25° C. (initial viscosity) was measured with a Brookfield type viscometer.

2) Thixotropy Index

The viscosity of the liquid epoxy resin composition at 1/10 of the speed of revolution used in the measurement (1) above was measured. The measured value was divided by the viscosity measured in (1) above to obtain a thixotropy index.

3) Pot Life

The liquid epoxy resin composition was stored at 5° C. for 1 month, and the viscosity at 25° C. was measured with a Brookfield type viscometer. The ratio of the measured value to the initial viscosity obtained in (1) above was taken as a measure of the pot life.

4) Gel Time 0.5 g of the liquid epoxy resin composition was dropped on a hot plate kept at 150° C. and kneaded with a spatula. The time required for the composition to become no more stringy was taken as a gel time.

5) Warp

A 1 mm high dam was formed of silicone rubber on the periphery of a flat epoxy-glass laminate (35 mm×35 mm×0.5 mm), and 2.0 g of the liquid epoxy resin composition was applied to the area surrounded by the dam and cured. The warp of the laminate was measured with a surface roughness meter.

6) Flow Height

A flat ceramic plate was placed on a hot platen kept at 70° C., and 0.65 g of the liquid epoxy resin composition was dropped thereon, allowed to stand for 5 minutes, and cured. The height of the cured resin was measured.

7) PCT Reliability

A silicon chip (9 mm×9 mm) having a 3 μm wide A1 pattern circuit mounted on an epoxy-glass laminate was sealed with the epoxy resin to prepare a test board. The test board was tested in a pressure cooker under conditions of 121° C., 2 atm, and 100% RH. The time taken for a circuit failure to occur was measured (n=10).

8) TCT (Temperature Cycling Test) Reliability

The same test board as used in (7) was subjected to 1000 temperature cycles in a gas phase, each cycle consisting of −55° C.×30 mins., room temperature×5 mins., and 125° C.×30 mins. The rate of circuit failure occurrence at the end of the 1000 cycles was obtained (n=10).

9) Reflow Reliability

The same test board as used in (7) was allowed to stand in a thermostat at 30° C. and 60% RH for 192 hours and then treated twice in an IR reflow oven (peak temperature: 240° C.) for 10 seconds each. The rate of circuit failure occurrence was obtained (n=10).

TABLE 1

| | | | \multicolumn{8}{c}{Example No.} | | | | | | | |
|---|---|---|---|---|---|---|---|---|---|---|
| | | | 1-1 | 1-2 | 1-3 | 1-4 | 1-5 | 1-6 | 1-7 | 1-8 |
| Composition (parts by wt.) | Cyanic Acid Ester (A) | L10 | 100 | 100 | 100 | 100 | 100 | 100 | 100 | 50 |
| | | B10 | 0 | 0 | 0 | 0 | 0 | 0 | 0 | 50 |
| | | M30 | 0 | 0 | 0 | 0 | 0 | 0 | 0 | 0 |
| | Epoxy Resin (B) | YD8125 | 100 | 100 | 100 | 130 | 70 | 100 | 100 | 100 |
| | | Epikote 828 | 0 | 0 | 0 | 0 | 0 | 0 | 0 | 0 |
| | Acid Anhydride (E1) | B650 | 30 | 30 | 30 | 30 | 30 | 2 | 67 | 30 |
| | | B570 | 0 | 0 | 0 | 0 | 0 | 0 | 0 | 0 |
| | Silicone Resin Gel (F) | | 0 | 0 | 0 | 0 | 0 | 0 | 0 | 0 |
| | Curing Catalyst (D) | Fe(III)(acac)$_3$ | 0.2 | 0.2 | 0.2 | 0.2 | 0.2 | 0.2 | 0.2 | 0.2 |
| | | Co(III)(acac)$_3$ | 0 | 0 | 0 | 0 | 0 | 0 | 0 | 0 |
| | | Manganese Naphthenate | 0 | 0 | 0 | 0 | 0 | 0 | 0 | 0 |
| | Coupling Agent (G) | KR-TTS | 0 | 0 | 0 | 0 | 0 | 0 | 0 | 0 |
| | | A187 | 0 | 0 | 0 | 0 | 0 | 0 | 0 | 0 |
| | Inorganic Filler (C): Silica | | 345 | 810 | 4370 | 922 | 709 | 745 | 946 | 810 |
| | Viscosity (P) | | 30 | 250 | 3500 | 310 | 200 | 380 | 180 | 240 |
| | Thixotropy Index | | 1.0 | 1.1 | 2.5 | 1.1 | 1.0 | 1.2 | 1.0 | 1.2 |
| | Pot Life | | 1.0 | 1.0 | 1.2 | 1.0 | 1.0 | 1.0 | 1.0 | 1.0 |
| | Gel Time | | 10'30" | 10'30" | 10'30" | 12'00" | 8'30" | 9'00" | 13'30" | 11'00" |
| | Warp (μm) | | 1300 | 600 | 150 | 850 | 400 | 450 | 900 | 580 |
| | Flow Height (mm) | | 0.4 | 0.5 | 2.5 | 1.0 | 0.6 | 1.0 | 0.5 | 0.6 |
| Reliability | PCT (hr) | | 400 | 500 | 500 | 500 | 400 | 500 | 300 | 500 |
| | TCT (%) | | 0 | 0 | 0 | 0 | 0 | 0 | 0 | 0 |
| | Reflow (%) | | 40 | 0 | 0 | 0 | 0 | 0 | 0 | 0 |

| | | | \multicolumn{8}{c}{Example No.} | | | | | | | |
|---|---|---|---|---|---|---|---|---|---|---|
| | | | 1-9 | 1-10 | 1-11 | 1-12 | 1-13 | 1-14 | 1-15 | 1-16 |
| Composition (parts by wt.) | Cyanic Acid Ester (A) | L10 | 10 | 100 | 100 | 100 | 100 | 100 | 100 | 100 |
| | | B10 | 90 | 0 | 0 | 0 | 0 | 0 | 0 | 0 |
| | | M30 | 0 | 0 | 0 | 0 | 0 | 0 | 0 | 0 |
| | Epoxy Resin (B) | YD8125 | 100 | 100 | 100 | 100 | 100 | 100 | 1900 | 100 |
| | | Epikote 828 | 0 | 0 | 0 | 0 | 0 | 0 | 0 | 0 |
| | Acid Anhydride (E1) | B650 | 30 | 30 | 30 | 30 | 30 | 30 | 30 | 30 |
| | | B570 | 0 | 0 | 0 | 0 | 0 | 0 | 0 | 0 |
| | Silicone Resin Gel (F) | | 0 | 25 | 55 | 25 | 25 | 25 | 25 | 25 |
| | Curing Catalyst (D) | Fe(III)(acac)$_3$ | 0.2 | 0.2 | 0.2 | 0 | 0.2 | 0.2 | 0.01 | 1.0 |
| | | Co(III)(acac)$_3$ | 0 | 0 | 0 | 0.2 | 0 | 0 | 0 | 0 |
| | | Manganese Naphthenate | 0 | 0 | 0 | 0 | 0 | 0 | 0 | 0 |
| | Coupling Agent (G) | KR-TTS | 0 | 0 | 0 | 0 | 0.26 | 28.0 | 0 | 0 |
| | | A187 | 0 | 0 | 0 | 0 | 0 | 0 | 0 | 0 |
| | Inorganic Filler (C): Silica | | 810 | 900 | 1010 | 900 | 900 | 1003 | 900 | 900 |
| | Viscosity (P) | | 210 | 370 | 580 | 690 | 340 | 250 | 370 | 380 |
| | Thixotropy Index | | 1.2 | 1.2 | 1.2 | 1.9 | 1.0 | 1.0 | 1.2 | 1.2 |
| | Pot Life | | 1.0 | 1.0 | 1.1 | 1.0 | 1.1 | 1.2 | 1.0 | 1.2 |
| | Gel Time | | 11'10" | 10'00" | 10'00" | 35'00" | 7'00" | 2'30" | 35'00" | 2'00" |
| | Warp (μm) | | 550 | 250 | 50 | 250 | 100 | 10 | 400 | 250 |
| | Flow Height (mm) | | 0.6 | 1.2 | 1.4 | 2.5 | 0.7 | 0.5 | 1.1 | 1.2 |
| Reliability | PCT (hr) | | 500 | 500 | 400 | 500 | 400 | 300 | 400 | 370 |
| | TCT (%) | | 0 | 0 | 0 | 0 | 0 | 10 | 15 | 0 |
| | Reflow (%) | | 0 | 0 | 0 | 0 | 0 | 0 | 0 | 0 |

| | | | \multicolumn{7}{c}{Example No.} | | | | | | |
|---|---|---|---|---|---|---|---|---|---|
| | | | 1-17 | 1-18 | 1-19 | 1-20 | 1-21 | 1-22 | 1-23 |
| Composition (parts by wt.) | Cyanic Acid Ester (A) | L10 | 70 | 100 | 100 | 100 | 100 | 100 | 100 |
| | | B10 | 0 | 0 | 0 | 0 | 0 | 0 | 0 |
| | | M30 | 30 | 0 | 0 | 0 | 0 | 0 | 0 |
| | Epoxy Resin (B) | YD8125 | 0 | 100 | 100 | 100 | 100 | 100 | 100 |
| | | Epikote 828 | 100 | 0 | 0 | 0 | 0 | 0 | 0 |
| | Acid Anhydride (E1) | B650 | 0 | 30 | 30 | 30 | 30 | 30 | 30 |
| | | B570 | 20 | 0 | 0 | 0 | 0 | 0 | 0 |
| | Silicone Resin Gel (F) | | 0 | 25 | 99 | 25 | 25 | 25 | 25 |
| | Curing Catalyst (D) | Fe(III)(acac)$_3$ | 0 | 0.2 | 0.2 | 0.005 | 5 | 0.2 | 0.2 |
| | | Co(III)(acac)$_3$ | 0 | 0 | 0 | 0 | 0 | 0 | 0 |
| | | Manganese Naphthenate | 0.2 | 0 | 0 | 0 | 0 | 0 | 0 |
| | Coupling Agent (G) | KR-TTS | 0 | 0 | 0 | 0 | 0 | 64 | 0.13 |
| | | A187 | 0 | 12 | 0 | 0 | 0 | 0 | 0 |
| | Inorganic Filler (C): Silica | | 500 | 947 | 1166 | 900 | 900 | 1130 | 900 |
| | Viscosity (P) | | 950 | 210 | 3100 | 370 | 410 | 150 | 350 |
| | Thixotropy Index | | 1.1 | 1.1 | 1.6 | 1.2 | 1.2 | 1.0 | 1.2 |

TABLE 1-continued

| | | | | | | | | |
|---|---|---|---|---|---|---|---|---|
| Pot Life | | 1.0 | 1.0 | 1.2 | 1.0 | 2.5 | 1.6 | 1.0 |
| Gel Time | | 8'00" | 11'00" | 12'00" | 45'< | 0'15" | 1'30" | 9'30" |
| Warp (μm) | | 450 | 400 | 50 | 2900 | 600 | 400 | 250 |
| Flow Height (mm) | | 0.6 | 1.1 | 3< | 1.2 | 1.3 | 0.8 | 1.1 |
| Reliability | PCT (hr) | 600 | 400 | 250 | 150 | 250 | 150 | 400 |
| | TCT (%) | 0 | 0 | 0 | 0 | 0 | 50 | 0 |
| | Reflow (%) | 0 | 0 | 0 | 40 | 20 | 40 | 0 |

TABLE 2

| Comparative Example No. | 1-1 | 1-2 | 1-3 | 1-4 | 1-5 | 1-6 |
|---|---|---|---|---|---|---|
| Composition (parts by wt.) | | | | | | |
| Cyanic Acid Ester (A) | | | | | | |
| L10 | 100 | 100 | 100 | 100 | 100 | 100 |
| B10 | 0 | 0 | 0 | 0 | 0 | 0 |
| M30 | 0 | 0 | 0 | 0 | 0 | 0 |
| Epoxy Resin (B) | | | | | | |
| YD8125 | 100 | 100 | 200 | 50 | 100 | 100 |
| Epikote 828 | 0 | 0 | 0 | 0 | 0 | 0 |
| Acid An-hydride (E1) | | | | | | |
| B650 | 30 | 30 | 30 | 30 | 0 | 133 |
| B570 | 0 | 0 | 0 | 0 | 0 | 0 |
| Silicone Resin Gel (F) | 0 | 0 | 0 | 0 | 0 | 0 |
| Curing Catalyst (D) | | | | | | |
| Fe(III) (acac)$_3$ | 0.2 | 0.2 | 0.2 | 0.2 | 0.2 | 0.2 |
| Co(III) (acac)$_3$ | 0 | 0 | 0 | 0 | 0 | 0 |
| Manganese Naphthenate | 0 | 0 | 0 | 0 | 0 | 0 |
| Coupling Agent (G) | | | | | | |
| KR-TTS | 0 | 0 | 0 | 0 | 0 | 0 |
| A187 | 0 | 0 | 0 | 0 | 0 | 0 |
| Inorganic Filler (C): Silica | 113 | 11270 | 1170 | 638 | 710 | 1180 |
| Viscosity (P) | 30 | unmeasurable | 440 | 160 | 450 | 150 |
| Thixotropy Index | 1.0 | | 1.2 | 1.1 | 1.3 | 1.0 |
| Pot Life | 1.0 | 1.5 | 1.0 | 1.0 | 1.0 | 1.0 |
| Gel Time | 9'00" | 9'00" | 21'00" | 8'00" | 8'30" | 16'00" |
| Warp (μm) | 3700 | 100 | 1600 | 350 | 380 | 1700 |
| Flow Height (mm) | 0.4 | 3< | 1.3 | 0.7 | 1.5 | 0.5 |
| Reliability | | | | | | |
| PCT (hr) | 200 | 300 | 300 | 150 | 500 | 150 |
| TCT (%) | 100 | 50 | 70 | 0 | 0 | 40 |
| Reflow (%) | 100 | 0 | 50 | 70 | 0 | 70 |

The epoxy resin composition of the present invention comprising components A, B, C, D, and E1 are liquid at ambient temperature, possessing the merits of conventional liquid sealing compounds—low viscosity, easiness in handling, and a long pot life, and provides a cured resin excellent in moisture-resistance and heat-resistance reliability.

Where 4,4'-ethylidenebisphenylene cyanate is used in a specific ratio to the total component A, other cyanic acid esters that are solid at room temperature can be used in combination, and yet the resin composition is prevented from solidifying.

The resin composition containing a silicone resin gel as a low-elasticity component has a reduced elastic modulus without being accompanied by agglomeration or upward migration of particles or phase separation in liquid.

The resin composition containing an iron (III) chelate as a curing catalyst has high flowability with very small thixotropy and is therefore advantageous in applications where the seal face must be flat such as with BGA.

The resin composition containing a cobalt (III) chelate as a curing catalyst exhibits high thixotropy and is therefore advantageous where there is no dams around a chip like a COB package.

The resin composition containing a titanate coupling agent exhibits improved flowability and low-temperature quick curability.

The semiconductor device sealed with the above-described liquid epoxy resin composition can cope with the demands for high integrity, high density, small thickness and-reduced weight of semiconductor packages and is excellent in moisture-resistance and heat-resistance reliability.

EXAMPLES 2-1 TO 2-30

AND

Comparative Examples 2-1 to 2-7

The components shown in Tables 3 to 5 below were uniformly mixed in a mixer and defoamed in vacuo to prepare a liquid epoxy resin composition.

The physical properties and curing properties of the resulting liquid epoxy resin compositions were measured in the same manner as in the foregoing Examples and, in addition, adhesive strength under shear of the composition was measured according to the following test method. Silicon chips mounted and wire-bonded on a printed wiring board were sealed with each of the resin compositions in the same manner as in the foregoing Examples, and the resulting sealed silicon chips were evaluated for reliability in the same manner as in the foregoing Examples. The results obtained are shown in Tables 3 to 5.

Test Methods

10) Adhesive Strength Under Shear

A pair of 100 mm long, 10 mm wide and 1 mm thick aluminum plates were joined with the epoxy resin composition applied over an area of 10×10 mm$^2$ and pulled in the lengthwise direction to obtain the breaking strength.

Further, the epoxy resin composition was injected into a molding die for sealing semiconductor chips having a silicone release agent previously applied to the cavity wall thereof, maintained at 150° C. for 15 minutes, taken out of the die, and post-cured at 150° C. for 3 hours.

TABLE 3

| Comparative Example No. | 2-1 | 2-2 | 2-3 | 2-4 | 2-5 | 2-6 | 2-7 | 2-8 | 2-9 | 2-10 |
|---|---|---|---|---|---|---|---|---|---|---|
| Composition (parts by wt.) Cyanic Acid Ester (A) | | | | | | | | | | |
| L10 | 100 | 100 | 100 | 100 | 100 | 100 | 100 | 100 | 100 | 50 |
| B10 | 0 | 0 | 0 | 0 | 0 | 0 | 0 | 0 | 0 | |
| M30 | 0 | 0 | 0 | 0 | 0 | 0 | 0 | 0 | 0 | 0 |
| Epoxy Resin (B) | | | | | | | | | | |
| YD8125 | 100 | 100 | 100 | 200 | 55 | 100 | 100 | 100 | 100 | 100 |
| Epikote 828 | 0 | 0 | 0 | 0 | 0 | 0 | 0 | 0 | 0 | 0 |
| Dihydrazide Compound (E2) | | | | | | | | | | |
| 2.4HT* | 12 | 12 | 12 | 12 | 12 | 1 | 6 | 17 | 30 | 12 |
| Silicone Resin Gel (F) | 0 | 0 | 0 | 0 | 0 | 0 | 0 | 0 | 0 | 0 |
| Curing Catalyst (D) | | | | | | | | | | |
| Fe(III) (acac)$_3$ | 0.2 | 0.2 | 0.2 | 0.2 | 0.2 | 0.2 | 0.2 | 0.2 | 0.2 | 0.2 |
| Co(III) (acac)$_3$ | 0 | 0 | 0 | 0 | 0 | 0 | 0 | 0 | 0 | 0 |
| Manganese Naphthenate | 0 | 0 | 0 | 0 | 0 | 0 | 0 | 0 | 0 | 0 |
| Coupling Agent (G) | | | | | | | | | | |
| A187 | 11 | 11 | 11 | 14 | 9 | 11 | 11 | 11 | 12 | 11 |
| Inorganic Filler (C): Silica | 335 | 791 | 4241 | 979 | 625 | 752 | 770 | 809 | 859 | 791 |
| Viscosity (P) | 40 | 310 | 3900 | 500 | 190 | 250 | 280 | 380 | 790 | 270 |
| Thixotropy Index | 1.1 | 1.1 | 2.5 | 1.2 | 1.0 | 1.0 | 1.1 | 1.4 | 1.7 | 1.2 |
| Pot Life | 1.0 | 1.0 | 1.3 | 1.0 | 1.1 | 1.0 | 1.0 | 1.1 | 1.0 | 1.0 |
| Gel Time | 1'30" | 1'30" | 1'30" | 3'00" | 0'20" | 8'00" | 5'30" | 0'45" | 0'15" | 1'45" |
| Warp (μm) | 450 | 250 | 70 | 530 | 150 | 450 | 350 | 200 | 110 | 230 |
| Flow Height (mm) | 0.7 | 0.8 | 2.6 | 1.5 | 0.7 | 0.5 | 0.7 | 1.1 | 2.0 | 0.9 |
| Adhesive Strength under Shear (kg/cm$^2$) | 185 | 195 | 150 | 135 | 230 | 155 | 175 | 210 | 215 | 190 |
| Reliability | | | | | | | | | | |
| PCT (hr) | 400 | 500 | 450 | 400 | 400 | 500 | 500 | 400 | 300 | 500 |
| TCT (%) | 0 | 0 | 0 | 70 | 0 | 0 | 0 | 0 | 0 | 0 |
| Reflow (%) | 30 | 0 | 0 | 10 | 0 | 0 | 0 | 0 | 0 | 0 |

| Comparative Example No. | 2-11 | 2-12 | 2-13 | 2-14 | 2-15 | 2-16 | 2-17 | 2-18 | 2-19 | 2-20 |
|---|---|---|---|---|---|---|---|---|---|---|
| Composition (parts by wt.) Cyanic Acid Ester (A) | | | | | | | | | | |
| L10 | 10 | 70 | 100 | 100 | 100 | 100 | 100 | 100 | 100 | 100 |
| B10 | 90 | 0 | 0 | 0 | 0 | 0 | 0 | 0 | 0 | 0 |
| M30 | 0 | 30 | 0 | 0 | 0 | 0 | 0 | 0 | 0 | 0 |
| Epoxy Resin (B) | | | | | | | | | | |
| YD8125 | 100 | 100 | 100 | 100 | 100 | 100 | 100 | 100 | 100 | 100 |
| Epikote 828 | 0 | 0 | 0 | 0 | 0 | 0 | 0 | 0 | 0 | 0 |
| Dihydrazide Compound (E2) | | | | | | | | | | |
| 2.4HT* | 12 | 12 | 12 | 12 | 12 | 12 | 12 | 12 | 12 | 12 |
| Silicone Resin Gel (F) | 0 | 0 | 25 | 75 | 0 | 0 | 0 | 0 | 0 | 0 |
| Curing Catalyst (D) | | | | | | | | | | |
| Fe(III) (acac)$_3$ | 0.2 | 0.2 | 0.2 | 0.2 | 0 | 0 | 0.01 | 1.0 | 0.2 | 0.2 |
| Co(III) (acac)$_3$ | 0 | 0 | 0 | 0 | 0.2 | 0 | 0 | 0 | 0 | 0 |
| Manganese Naphthenate | 0 | 0 | 0 | 0 | 0 | 0.2 | 0 | 0 | 0 | 0 |
| Coupling Agent (G) | | | | | | | | | | |
| A187 | 11 | 11 | 12 | 15 | 11 | 11 | 11 | 11 | 0 | 23 |
| Inorganic Filler (C): Silica | 791 | 791 | 984 | 1071 | 797 | 791 | 791 | 794 | 753 | 833 |
| Viscosity (P) | 240 | 1010 | 450 | 1350 | 300 | 270 | 310 | 320 | 540 | 230 |
| Thixotropy Index | 1.2 | 1.2 | 1.5 | 2.2 | 1.7 | 10 | 1.1 | 1.1 | 1.3 | 1.0 |
| Pot Life | 1.0 | 1.0 | 1.1 | 1.2 | 1.0 | 1.0 | 1.0 | 1.3 | 1.0 | 1.0 |
| Gel Time | 2'00" | 1'10" | 1'15" | 1'15" | 2'30" | 1'15" | 11'00" | 0'50" | 1'20" | 2'50" |
| Warp (μm) | 220 | 200 | 90 | 20 | 350 | 220 | 350 | 150 | 190 | 370 |
| Flow Height (mm) | 0.9 | 1.1 | 1.9 | 2.5 | 1.8 | 0.8 | 0.7 | 0.9 | 1.2 | 0.7 |
| Adhesive Strength under Shear (kg/cm$^2$) | 185 | 180 | 175 | 160 | 170 | 185 | 120 | 180 | 135 | 205 |
| Reliability | | | | | | | | | | |
| PCT (hr) | 500 | 500 | 500 | 400 | 450 | 550 | 400 | 350 | 450 | 300 |
| TCT (%) | 0 | 0 | 0 | 70 | 0 | 0 | 10 | 0 | 10 | 0 |
| Reflow (%) | 30 | 0 | 0 | 10 | 0 | 0 | 0 | 0 | 0 | 0 |

Note:
*Average particle size: 15 μm

TABLE 4

| Example No. | 2-21 | 2-22 | 2-23 | 2-24 | 2-25 | 2-26 | 2-27 | 2-29 | 2-29 | 2-30 |
|---|---|---|---|---|---|---|---|---|---|---|
| Composition (parts by wt.) Cyanic Acid Ester (A) | | | | | | | | | | |
| L10 | 100 | 100 | 100 | 100 | 100 | 100 | 100 | 100 | 100 | 100 |
| B10 | 0 | 0 | 0 | 0 | 0 | 0 | 0 | 0 | 0 | 0 |
| M30 | 0 | 0 | 0 | 0 | 0 | 0 | 0 | 0 | 0 | 0 |
| Epoxy Resin (B) | | | | | | | | | | |
| YD8125 | 100 | 100 | 100 | 0 | 100 | 100 | 100 | 100 | 100 | 100 |
| Epikote 828 | 0 | 0 | 0 | 100 | 0 | 0 | 0 | 0 | 0 | 0 |
| Dihydrazide Compound (E2) | | | | | | | | | | |
| 2.4HT* | 12 | 12 | 12 | 12 | 12 | 12 | 0 | 0 | 0 | 12 |
| ADH | 0 | 0 | 0 | 0 | 0 | 0 | 12 | 0 | 0 | 0 |
| SDH | 0 | 0 | 0 | 0 | 0 | 0 | 0 | 12 | 0 | 0 |
| VDH | 0 | 0 | 0 | 0 | 0 | 0 | 0 | 0 | 12 | 0 |
| Silicone Resin Gel (F) | 0 | 0 | 0 | 0 | 0 | 0 | 0 | 0 | 0 | 0 |
| Curing Catalyst (D): Fe(III) (acac)$_3$ | 0.2 | 0.2 | 0.2 | 0.2 | 0.2 | 0.2 | 0.2 | 0.2 | 0.2 | 0.2 |
| Cure Accelerator (H) | | | | | | | | | | |
| 2MA-OK | 0.1 | 0 | 0 | 0 | 0.2 | 0 | 0 | 0 | 0 | 0 |
| PN-23 | 0 | 0.1 | 20 | 0 | 0 | 0.2 | 0 | 0 | 0 | 0 |
| Coupling Agent (G): A187 | 11 | 11 | 12 | 11 | 11 | 11 | 11 | 11 | 11 | 11 |
| Inorganic Filler (C): Silica | 792 | 792 | 866 | 791 | 797 | 791 | 791 | 791 | 791 | 791 |
| Viscosity (P) | 310 | 310 | 510 | 1110 | 450 | 330 | 250 | 230 | 390 | 310 |
| Thixotropy Index | 1.0 | 1.1 | 1.3 | 1.1 | 1.5 | 1.1 | 1.1 | 1.1 | 1.2 | 1.1 |
| Pot Life | 1.3 | 1.3 | 1.6 | 1.0 | 1.0 | 1.0 | 1.1 | 1.2 | 1.1 | 1.0 |
| Gel Time | 1'20" | 1'15" | 0'50" | 1'30" | 1'20" | 1'30" | 1'10" | 1'00" | 2'00" | 1'30" |
| Warp (μm) | 230 | 220 | 170 | 250 | 200 | 260 | 350 | 450 | 300 | 10 |
| Flow Height (mm) | 0.8 | 0.8 | 0.9 | 1.1 | 0.7 | 0.8 | 0.7 | 0.7 | 0.9 | — |
| Adhesive Strength under Shear (kg/cm$^2$) | 205 | 210 | 185 | 190 | 210 | 180 | 190 | 180 | 150 | 195 |
| Reliability | | | | | | | | | | |
| PCT (hr) | 400 | 400 | 300 | 500 | 500 | 500 | 300 | 250 | 300 | 500 |
| TCT (%) | 0 | 0 | 0 | 0 | 0 | 0 | 0 | 0 | 0 | 0 |
| Reflow (%) | 0 | 0 | 0 | 0 | 0 | 0 | 0 | 0 | 0 | 0 |

Note: *Average particle size: 15 μm in Examples 2-21 to 2-24; 5 μm in Example 2-25; 30 μm in Example 26

TABLE 5

| Comparative Example No. | 2-1 | 2-2 | 2-3 | 2-4 | 2-5 | 2-6 | 2-7 |
|---|---|---|---|---|---|---|---|
| Composition (parts by wt.) Cyanic Acid Ester (A) | | | | | | | |
| L10 | 100 | 100 | 100 | 100 | 100 | 100 | 100 |
| B10 | 0 | 0 | 0 | 0 | 0 | 0 | 0 |
| M30 | 0 | 0 | 0 | 0 | 0 | 0 | 0 |
| Epoxy Resin (B) | | | | | | | |
| YD8125 | 100 | 100 | 300 | 50 | 100 | 100 | 100 |
| Epikote 828 | 0 | 0 | 0 | 0 | 0 | 0 | 0 |
| Dihydrazide Compound (E2) | | | | | | | |
| 2.4HT* | 12 | 12 | 12 | 12 | 0 | 40 | 40 |
| Silicone Resin Gel (F) | 0 | 0 | 0 | 0 | 0 | 0 | 0 |
| Curing Catalyst (D) | | | | | | | |
| Fe(III) (acac)$_3$ | 0.2 | 0.2 | 0.2 | 0.2 | 0.2 | 0.2 | 0.2 |
| Co(III) (acac)$_3$ | 0 | 0 | 0 | 0 | 0.2 | 0 | 0 |
| Manganese Naphthenate | 0 | 0 | 0 | 0 | 0 | 0.2 | 0 |
| Coupling Agent (G) | | | | | | | |
| A187 | 11 | 11 | 21 | 9 | 11 | 13 | 11 |
| Inorganic Filler (C): Silica | 109 | 10952 | 1536 | 607 | 749 | 898 | 791 |
| Viscosity (P) | 25 | unmeasurable | 700 | 170 | 245 | 950 | 900 |
| Thixotropy Index | 1.0 | | 1.4 | 1.0 | 1.0 | 2.0 | 1.8 |
| Pot Life | 1.0 | 1.3 | 1.0 | 1.1 | 1.0 | 1.3 | 1.3 |
| Gel Time | 1'30" | 1'40" | 5'00" | 0'15" | 9'00" | 0'05" | non-uniform |
| Warp (μm) | 1200 | 40 | 630 | 120 | 480 | 110 | 170 |
| Flow Height (mm) | 0.5 | 3< | 1.8 | 0.6 | 0.7 | 3.0 | 2.5 |
| Adhesive Strength under Shear (kg/cm$^2$) | 140 | 95 | 110 | 200 | 140 | 200 | 170 |

TABLE 5-continued

| Comparative Example No. | 2-1 | 2-2 | 2-3 | 2-4 | 2-5 | 2-6 | 2-7 |
|---|---|---|---|---|---|---|---|
| Reliability | | | | | | | |
| PCT (hr) | 200 | 250 | 300 | 100 | 450 | 200 | 150 |
| TCT (%) | 100 | 50 | 70 | 0 | 0 | 10 | 30 |
| Reflow (%) | 100 | 0 | 50 | 70 | 0 | 80 | 50 |

Note: *Average particle size: 15 μm in Comparative Examples 2-1 to 2-6; 150 μm in Comparative Example 2-7

The epoxy resin composition of the present invention comprising components A, B, C, D and E2 are liquid at ambient temperature, possessing the merits of conventional liquid sealing compounds—low viscosity, easiness in handling, and a long pot life, and provides a cured resin excellent in moisture-resistance and heat-resistance reliability.

Where 4,4'-ethylidenebisphenylene cyanate is used in a specific ratio to the total component A, other cyanic acid esters that are solid at room temperature can be used in combination, and yet the resin composition is prevented from solidifying.

Where the dihydrazide compound E2 has an average particle size of 100 μm or smaller and/or where the dihydrazide compound is 2,4-dihydrazino-6-methylamino-sym-triazine, the composition has a long pot life, rapidly cures at a high temperature of about 150° C., and is less causative of warpage of a wiring substrate.

Where the resin composition contains a silicone resin gel as a low-elasticity component, the elastic modulus can be reduced without being accompanied by agglomeration or upward migration of particles or phase separation in liquid.

The resin composition containing an iron (III) chelate as a curing catalyst has high flowability with very small thixotropy and is therefore advantageous in applications where the seal face must be flat such as with BGA.

The resin composition containing a cobalt (III) chelate as a curing catalyst exhibits high thixotropy and is therefore advantageous where there is no dams around a chip like a COB package.

The resin composition containing an epoxysilane coupling agent exhibits improved flowability and improved adhesion.

The semiconductor device sealed with the above-described liquid epoxy resin composition can cope with the demands for high integrity, high density, small thickness and reduced weight of semiconductor packages and is excellent in moisture-resistance and heat-resistance reliability.

According to the process of the invention for producing a semiconductor device, sealing of semiconductor chips can be carried out by injection molding using the liquid epoxy resin composition of the present invention. There is no need to make a powdered molding material into tablets nor to melt a tablet as have been required in a conventional transfer molding technique, which is greatly contributory to process simplification. The process of the invention can cope with the demands for high integrity, high density, small thickness and reduced weight of semiconductor packages and provides semiconductor devices excellent in moisture-resistance and heat-resistance reliability.

EXAMPLES 3-1 TO 3-26

AND

Comparative Examples 3-1 to 3-6

The components shown in Tables 6 and 7 below were uniformly mixed in a mixer and defoamed in vacuo to prepare a liquid epoxy resin composition.

The physical properties and curing properties of the resulting liquid epoxy resin compositions were measured in the same manner as in the foregoing Examples. Further, silicon chips mounted and wire-bonded on a printed wiring board were sealed with each of the resin compositions in the same manner as in the foregoing Examples, and the resulting sealed silicon chips were evaluated for reliability in the same manner as in the foregoing Examples. The results obtained are shown in Tables 6 and 7.

TABLE 6

| Example No. | 3-1 | 3-2 | 3-3 | 3-4 | 3-5 | 3-6 | 3-7 | 3-8 | 3-9 | 3-10 | 3-11 | 3-12 | 3-13 |
|---|---|---|---|---|---|---|---|---|---|---|---|---|---|
| Composition (parts by wt.) | | | | | | | | | | | | | |
| Cyanic Acid Ester (A) | | | | | | | | | | | | | |
| L10 | 100 | 100 | 100 | 100 | 100 | 70 | 100 | 100 | 50 | 10 | 100 | 100 | 100 |
| B10 | 0 | 0 | 0 | 0 | 0 | 0 | 0 | 0 | 50 | 90 | 0 | 0 | 0 |
| M30 | 0 | 0 | 0 | 0 | 0 | 30 | 0 | 0 | 0 | 0 | 0 | 0 | 0 |
| Epoxy Resin (B) | | | | | | | | | | | | | |
| YD8125 | 100 | 100 | 100 | 130 | 70 | 0 | 100 | 100 | 100 | 100 | 100 | 100 | 100 |
| Epikote 828 | 0 | 0 | 0 | 0 | 0 | 100 | 0 | 0 | 0 | 0 | 0 | 0 | 0 |
| Acid Anhydride (E1) | | | | | | | | | | | | | |
| B650 | 0 | 0 | 0 | 0 | 0 | 0 | 2.3 | 96 | 0 | 0 | 0 | 0 | 0 |
| B570 | 0 | 0 | 0 | 0 | 0 | 0 | 0 | 0 | 0 | 0 | 0 | 0 | 0 |
| Silicone Resin Gel (F) | 25 | 25 | 25 | 28 | 21 | 25 | 25 | 36 | 25 | 25 | 5 | 50 | 80 |
| Curing Catalyst (D) | | | | | | | | | | | | | |
| Fe(III) (acac)$_3$ | 0.2 | 0.2 | 0.2 | 0.2 | 0.2 | 0.2 | 0.2 | 0.2 | 0.2 | 0.2 | 0 | 0 | 0 |
| Co(III) (acac)$_3$ | 0 | 0 | 0 | 0 | 0 | 0 | 0 | 0 | 0 | 0 | 0.1 | 0.3 | 0.5 |

TABLE 6-continued

| | | | | | | | | | | | | | |
|---|---|---|---|---|---|---|---|---|---|---|---|---|---|
| Manganese Naphthenate Amine Compound (H) | 0 | 0 | 0 | 0 | 0 | 0 | 0 | 0 | 0 | 0 | 0 | 0 | 0 |
| 2MA-OK | 0 | 0 | 0 | 0 | 0 | 0 | 0 | 0 | 0 | 0 | 0 | 0 | 0 |
| PN-23 | 0 | 0 | 0 | 0 | 0 | 0 | 0 | 0 | 0 | 0 | 0 | 0 | 0 |
| Coupling Agent (G) | | | | | | | | | | | | | |
| KR-TTS | 0 | 0 | 0 | 0 | 0 | 0 | 0 | 0 | 0 | 0 | 0 | 0 | 0 |
| A187 | 0 | 0 | 0 | 0 | 0 | 0 | 0 | 0 | 0 | 0 | 0 | 0 | 0 |
| Inorganic Filler (C): Silica | 338 | 798 | 4275 | 915 | 677 | 798 | 806 | 1177 | 798 | 798 | 747 | 886 | 900 |
| Viscosity (P) | 110 | 500 | 4000 | 550 | 350 | 1500 | 470 | 250 | 470 | 450 | 300 | 750 | 950 |
| Thixotropy Index | 1.1 | 1.3 | 2.5 | 1.3 | 1.2 | 1.4 | 1.2 | 1.1 | 1.3 | 1.4 | 1.1 | 1.5 | 1.6 |
| Pot Life | 1.0 | 1.0 | 1.2 | 1.0 | 1.0 | 1.0 | 1.0 | 1.0 | 1.0 | 1.0 | 1.0 | 1.0 | 1.1 |
| Gel Time | 8'30" | 8'30" | 8'30" | 15'00" | 6'30" | 9'30" | 9'00" | 13'30" | 9'00" | 9'30" | 9'00" | 8'30" | 8'00" |
| Warp (μm) | 800 | 200 | 90 | 400 | 150 | 150 | 250 | 500 | 200 | 180 | 300 | 50 | 50 |
| Flow Height (mm) | 0.7 | 1.3 | 2.7 | 1.4 | 1.1 | 1.4 | 1.0 | 0.7 | 1.4 | 1.4 | 0.9 | 2.0 | 3.0 |
| Reliability | | | | | | | | | | | | | |
| PCT (hr) | 400 | 500 | 500 | 500 | 300 | 500 | 500 | 300 | 500 | 500 | 500 | 400 | 300 |
| TCT (%) | 0 | 0 | 0 | 0 | 0 | 0 | 0 | 0 | 0 | 0 | 0 | 0 | 0 |
| Reflow (%) | 30 | 0 | 0 | 0 | 0 | 0 | 0 | 0 | 0 | 0 | 0 | 0 | 0 |

| Example No. | 3-14 | 3-15 | 3-16 | 3-17 | 3-18 | 3-19 | 3-20 | 3-21 | 3-22 | 3-23 | 3-24 | 3-25 | 3-26 |
|---|---|---|---|---|---|---|---|---|---|---|---|---|---|
| Composition (parts by wt.) | | | | | | | | | | | | | |
| Cyanic Acid Ester (A) | | | | | | | | | | | | | |
| L10 | 100 | 100 | 100 | 100 | 100 | 100 | 100 | 100 | 100 | 100 | 100 | 100 | 100 |
| B10 | 0 | 0 | 0 | 0 | 0 | 0 | 0 | 0 | 0 | 0 | 0 | 0 | 0 |
| M30 | 0 | 0 | 0 | 0 | 0 | 0 | 0 | 0 | 0 | 30 | 0 | 0 | 0 |
| Epoxy Resin (B) | | | | | | | | | | | | | |
| YD8125 | 100 | 100 | 100 | 100 | 100 | 100 | 100 | 100 | 100 | 100 | 100 | 100 | 100 |
| Epikote 828 | 0 | 0 | 0 | 0 | 0 | 0 | 0 | 0 | 0 | 0 | 0 | 0 | 0 |
| Acid Anhydride (E1) | | | | | | | | | | | | | |
| B650 | 12 | 40 | 0 | 0 | 0 | 0 | 0 | 0 | 0 | 0 | 0 | 0 | 0 |
| B570 | 0 | 0 | 0 | 0 | 0 | 0 | 0 | 0 | 0 | 20 | 30 | 30 | 30 |
| Silicone Resin Gel (F) | 25 | 30 | 25 | 28 | 25 | 25 | 25 | 25 | 27 | 25 | 25 | 25 | 25 |
| Curing Catalyst (D) | | | | | | | | | | | | | |
| Fe(III) (acac)$_3$ | 0 | 0 | 0.1 | 0.3 | 0.01 | 1.0 | 0 | 0.2 | 0.2 | 0.2 | 0 | 0 | 0 |
| Co(III) (acac)$_3$ | 0 | 0 | 0 | 0 | 0 | 0 | 0.05 | 0 | 0 | 0 | 0 | 0 | 0 |
| Manganese Naphthenate Amine Compound (H) | 0.2 | 0.2 | 0 | 0 | 0 | 0 | 0 | 0 | 0 | 0 | 0.2 | 0 | 0 |
| 2MA-OK | 0 | 0 | 0 | 0 | 0 | 0 | 0 | 0.1 | 20 | 0 | 0 | 0 | 0 |
| PN-23 | 0 | 0 | 0 | 0 | 0 | 0 | 0 | 0 | 0 | 0.1 | 0 | 0 | 0 |
| Coupling Agent (G) | | | | | | | | | | | | | |
| KR-TTS | 0 | 0 | 0.26 | 25 | 0 | 0 | 0 | 0 | 0 | 0 | 0 | 6 | 12 |
| A187 | 0 | 0 | 0 | 0 | 0 | 0 | 0 | 0 | 0 | 0 | 12 | 0 | 0 |
| Inorganic Filler (C): Silica | 847 | 956 | 799 | 897 | 798 | 798 | 798 | 798 | 876 | 798 | 947 | 899 | 947 |
| Viscosity (P) | 400 | 320 | 450 | 300 | 500 | 550 | 750 | 500 | 550 | 500 | 210 | 200 | 200 |
| Thixotropy Index | 1.1 | 1.1 | 1.2 | 1.1 | 1.3 | 1.4 | 2.0 | 1.3 | 1.4 | 1.3 | 1.1 | 1.1 | 1.1 |
| Pot Life | 1.0 | 1.0 | 1.1 | 1.2 | 1.0 | 1.2 | 1.0 | 1.2 | 1.4 | 1.2 | 1.0 | 1.1 | 1.1 |
| Gel Time | 9'15" | 11'15" | 6'00" | 2'00" | 33'00" | 1'30" | 35'00" | 6'30" | 1'00" | 5'30" | 11'00" | 4'30" | 3'00" |
| Warp (μm) | 270 | 320 | 100 | 10 | 300 | 100 | 200 | 150 | 100 | 150 | 400 | 80 | 50 |
| Flow Height (mm) | 1.0 | 0.8 | 0.9 | 0.7 | 1.2 | 1.5 | 2.7 | 1.3 | 1.5 | 1.2 | 1.1 | 0.8 | 0.8 |
| Reliability | | | | | | | | | | | | | |
| PCT (hr) | 500 | 450 | 500 | 300 | 400 | 350 | 500 | 400 | 200 | 400 | 400 | 500 | 450 |
| TCT (%) | 0 | 0 | 0 | 1.0 | 20 | 0 | 0 | 0 | 0 | 0 | 0 | 0 | 0 |
| Reflow (%) | 0 | 0 | 0 | 0 | 0 | 0 | 30 | 0 | 0 | 0 | 0 | 0 | 0 |

TABLE 7

| Example No. | 3-1 | 3-2 | 3-3 | 3-4 | 3-5 | 3-6 |
|---|---|---|---|---|---|---|
| Composition (parts by wt.) | | | | | | |
| Cyanic Acid Ester (A) | | | | | | |
| L10 | 100 | 100 | 100 | 100 | 100 | 100 |
| B10 | 0 | 0 | 0 | 0 | 0 | 0 |
| M30 | 0 | 0 | 0 | 0 | 0 | 0 |
| Epoxy Resin (B) | | | | | | |
| YD8125 | 100 | 100 | 200 | 50 | 100 | 100 |
| Epikote 828 | 0 | 0 | 0 | 0 | 0 | 0 |

TABLE 7-continued

| Example No. | 3-1 | 3-2 | 3-3 | 3-4 | 3-5 | 3-6 |
|---|---|---|---|---|---|---|
| Acid Anhydride (E1) | | | | | | |
| B650 | 0 | 0 | 0 | 0 | 0 | 0 |
| B570 | 0 | 0 | 0 | 0 | 0 | 0 |
| Silicone Resin Gel (F) | 25 | 25 | 37 | 18 | 0 | 85.8 |
| Curing Catalyst (D) | | | | | | |
| Fe(III) (acac)$_3$ | 0.2 | 0.2 | 0.2 | 0.2 | 0.2 | 0.2 |
| Co(III) (acac)$_3$ | 0 | 0 | 0 | 0 | 0 | 0 |
| Manganese Naphthenate | 0 | 0 | 0 | 0 | 0 | 0 |
| Amine Compound (H) | | | | | | |
| 2MA-OK | 0 | 0 | 0 | 0 | 0 | 0 |
| PN-23 | 0 | 0 | 0 | 0 | 0 | 0 |
| Coupling Agent (G) | | | | | | |
| KR-TTS | 0 | 0 | 0 | 0 | 0 | 0 |
| A187 | 0 | 0 | 0 | 0 | 0 | 0 |
| Inorganic Filler (C): Silica | 111 | 11025 | 1195 | 597 | 709 | 1014 |
| Viscosity (P) | 60 | unmeasurable | 700 | 210 | 400 | 3500 |
| Thixotropy Index | 1.1 | | 1.5 | 1.2 | 1.2 | 1.7 |
| Pot Life | 1.0 | 1.6 | 1.0 | 1.0 | 1.0 | 1.2 |
| Gel Time | 8'30" | 8'30" | 21'00" | 5'00" | 8'30" | 9'00" |
| Warp (μm) | 2000 | 100 | 1000 | 100 | 430 | 50 |
| Flow Height (mm) | 0.6 | 3< | 1.5 | 0.9 | 1.1 | 3< |
| Reliability | | | | | | |
| PCT (hr) | 200 | 300 | 400 | 50 | 500 | 100 |
| TCT (%) | 50 | 40 | 20 | 0 | 10 | 0 |
| Reflow (%) | 100 | 0 | 50 | 10 | 0 | 0 |

The epoxy resin composition of the present invention comprising components A, B, C, D and F are liquid at ambient temperature, possessing the merits of conventional liquid sealing compounds—low viscosity, easiness in handling, and a long pot life, and provides a cured resin having low elasticity without being accompanied by agglomeration or upward migration of particles or phase separation in liquid.

Where 4,4'-ethylidenebisphenylene cyanate is used in a specific ratio to the total component A, other cyanic acid esters that are solid at room temperature can be used in combination, and yet the resin composition is prevented from solidifying.

The resin composition containing an iron (III) chelate as a curing catalyst has high flowability with very small thixotropy and is therefore advantageous in applications where the seal face must be flat such as with BGA.

The resin composition containing a cobalt (III) chelate as a curing catalyst exhibits high thixotropy and is therefore advantageous where there is no dams around a chip like a COB package.

Where the resin composition contains a liquid acid anhydride, the composition exhibits reduced thixotropy, showing improved flowability in sealing, and quick curability in low temperature.

Where the resin composition contains a titanate coupling agent, the composition exhibits improved flowability and quick curability in low temperature.

Where the resin composition contains an amino compound, the reaction of the epoxy resin is accelerated to have enhanced curing reactivity.

The semiconductor device sealed with the above-described liquid epoxy resin composition can cope with the demands for high integrity, high density, small thickness and reduced weight of semiconductor packages and is excellent in moisture-resistance and heat-resistance reliability.

While the invention has been described in detail and with reference to specific embodiments thereof, it will be apparent to one skilled in the art that various changes and modifications can be made therein without departing from the spirit and scope thereof.

What is claimed is:

1. A liquid epoxy resin composition for sealing a semiconductor device which comprises (A) a cyanic acid ester, (B) an epoxy resin, (C) an inorganic filler, (D) a metal chelate and/or a metal salt, and (E1) an acid anhydride, wherein at least one of components A and B is liquid at room temperature, component E1 is liquid at room temperature, the weight ratio of component C to the total weight of the composition is 0.60:1 to 0.95:1, the weight ratio of component A to component B is 0.76:1 to 1.43:1, and the weight ratio of component E1 to the total weight of the composition except component C is 0.01:1 to 0.3:1.

2. The epoxy resin composition according to claim 1, wherein said component A comprises (A1) 4,4'-ethylidenebisphenylene cyanate at an A1/A weight ratio of 0.1:1 to 1:1.

3. The epoxy resin composition according to claim 1, which further comprises (G1) a titanate coupling agent at a weight ratio of component GI to the total weight of the composition except component C of 0.001:1 to 0.1:1.

4. A semiconductor device sealed with the epoxy resin composition according to claim 1.

5. The composition of claim 1, wherein the cyanic acid ester is selected from the group consisting of 4,4'-ethylidenebisphenylene cyanate, 2,2-bis(4-cyanatophenyl) propane, bis(4-cyanato-3,5-dimethylphenyl) methane, and bis(4-cyanatophenyl) thioether.

6. The composition of claim 1, wherein the cyanic acid ester comprises 4,4'-ethylidenebisphenylene cyanate.

7. The composition of claim 1, wherein the epoxy resin comprises a single liquid epoxy resin, a mixture of liquid epoxy resins, or a mixture of a liquid epoxy resin and a solid epoxy resin.

8. The composition of claim 1, wherein the epoxy resin is selected from the group consisting of bisphenol A epoxy resin, bisphenol F epoxy resin, novolak epoxy resin, halogenated epoxy resin, glycidyl ester epoxy resin, alicyclic epoxy resin, bi-phenyl epoxy resin, naphthalene epoxy resin, heterocyclic epoxy resin, and mixtures thereof.

9. The composition of claim 1, wherein the epoxy resin is selected from the group consisting of bisphenol A epoxy resin and bisphenol F epoxy resin.

10. The composition of claim 1, wherein the inorganic filler is selected from the group consisting of crystalline silica, fused silica, alumina, calcium carbonate and zinc oxide.

11. The composition of claim 1, wherein the inorganic filler is fused silica.

12. The composition of claim 1, wherein the metal chelate comprises a metal selected from the group consisting of iron, copper, cobalt, zinc, tin, aluminum and manganese.

13. The composition of claim 1, wherein the metal chelate comprises a ligand selected from the group consisting of acetylacetonato, salicylaldehyde, and benzoylacetone.

14. The composition of claim 1, wherein the metal salt comprises naphthenate or octenate.

15. The composition of claim 1, wherein the anhydride is selected from the group consisting of methylhexahydrophthalic anhydride and methyltetrahydrophthalic anhydride.

16. A liquid epoxy resin composition for sealing a semiconductor device which comprises (A) a cyanic acid ester, (B) an epoxy resin, (C) an inorganic filler, (D) a metal chelate and/or a metal salt, and (E1) an acid anhydride, wherein at least one of components A and B is liquid at room temperature, component E1 is liquid at room temperature, the weight ratio of component C to the total weight of the composition is 0.60:1 to 0.95:1, the weight ratio of component A to component B is 0.76:1 to 1.43:1, and the weight ratio of component E1 to the total weight of the composition except component C is 0.10:1 to 0.15:1.

* * * * *